(12) United States Patent
Aoki

(10) Patent No.: US 6,652,129 B2
(45) Date of Patent: Nov. 25, 2003

(54) VEHICLE HEADLAMP

(75) Inventor: Takasumi Aoki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/127,681

(22) Filed: Apr. 23, 2002

(65) Prior Publication Data

US 2002/0181236 A1 Dec. 5, 2002

(30) Foreign Application Priority Data

Apr. 25, 2001 (JP) ..................................... P2001-127579

(51) Int. Cl.⁷ ................................................. F21V 9/00
(52) U.S. Cl. ........................ 362/511; 362/544; 362/551; 362/31
(58) Field of Search ................................. 362/511, 544, 362/551, 31

(56) References Cited

U.S. PATENT DOCUMENTS 4,816,968 A 3/1989 Yamada et al.
4,949,226 A 8/1990 Makita et al.
6,299,334 B1 * 10/2001 Schwanz et al. ............ 362/511

* cited by examiner

Primary Examiner—Sandra O'Shea
Assistant Examiner—Guiyoung Lee
(74) Attorney, Agent, or Firm—Sughrue Mion, PLLC

(57) ABSTRACT

A vehicle headlamp including a body having a rounded portion which may be, for example, rounded sideways. The headlamp includes a light source and a reflector disposed in the body with its opening being substantially directed forward. A dummy portion extends from the opening of the reflector up to the rounded portion, and a light guide is disposed along the front of the dummy portion. A cutout portion of the dummy portion is formed close to the opening of the reflector. An incident edge portion of the light guide is so positioned as to correspond to the cutout portion, and by making light from the light source incident upon the incident edge portion of the light guide, the light is made to spread throughout the light guide so that the whole light guide is caused to illuminate.

7 Claims, 6 Drawing Sheets

VEHICLE HEADLAMP

BACKGROUND OF THE INVENTION

1. Field of the Invention

The present invention relates to a vehicle headlamp. More specifically, the present invention relates to a vehicle headlamp where a lamp body of the headlamp includes a dummy portion substantially covered with a light guide which is employed and positioned to help create a common external appearance of the headlamp.

2. Description of the Related Art

With the progress of diversification in automobile design, there has also developed a demand for the diversification of a headlamp configuration because simple circular or square headlamps have failed to suit users' taste.

However, the functional configurations of reflectors as main elements for forming light beams from headlamps are restricted to a certain degree. Therefore, the difference in configuration between a uniquely designed lamp body and a reflector results in the lamp body having a portion that looks extremely mismatched with the outward appearance of the reflector, and accordingly, the appearance of the headlamp is diminished.

Heretofore, there has existed a technique in which a body portion of the headlamp, which is not covered with the reflector, is covered with a dummy portion. In this case, the interior covered with a lens is made to have a metal reflective surface by forming a film of metal, for example, a metallized film or coating of aluminum on the surface, which helps to create a common external appearance of the headlamp.

However, though the whole lamp body appears to have a common external appearance in the daytime, only the reflector portion looks illuminated at night. As such, there is a demand for making portions other than the reflector portion also look illuminated at night. Consequently, it has been devised to create such a common external appearance for the headlamp inclusive of the reflector by covering the dummy portion with a light guide and introducing light from a light source into the light guide at night.

In the case of a vehicle headlamp so arranged as to also illuminate the dummy portion using a conventional light guide, the incident edge portion of the light guide remains uncovered and is fully exposed to view. Because this incident edge portion is fully exposed to view, the problem of diminishing the common external appearance of the headlamp still exists. In particular, light distribution is arranged by reflectors, and lenses function as merely covers in recent vehicle headlamps. When a so-called see-through lens not having lens steps is used, the appearance of the incident edge portion of the light guide goes from bad to worse.

SUMMARY OF THE INVENTION

A problem to be solved by the invention is therefore to improve the appearance of a headlamp by preventing the incident edge portion of a light guide thereof from being seen from the outside.

In order to solve the foregoing problem, a vehicle headlamp according to the invention comprises:

a body including at least a portion having a curved form, a reflector disposed in the body, an opening of the reflector substantially directed forward, a dummy portion extending from the opening of the reflector to an end of the curved portion of the body, the dummy portion including a cutout portion formed close to the opening of the reflector;

a light guide disposed along at least a part of the dummy portion, and a light source, wherein an incident edge portion of the light guide is positioned to correspond to the cutout portion, and wherein the light guide is operable to illuminate as light from the light source becomes incident upon the incident edge portion of the light guide and is caused to spread throughout the light guide.

Thus, the appearance of the whole vehicle headlamp according to the invention is improved by introducing light into the light guide so as to make even the rounded portion illuminate. As the incident edge portion of the light guide is positioned so as to correspond to the cutout portion formed in part of the dummy portion, the incident edge portion is hardly seen through a lens and the appearance of the incident edge portion of the light guide does not diminish the appearance of the headlamp.

DETAILED DESCRIPTION OF THE PREFERRED EMBODIMENTS

Figure 1:
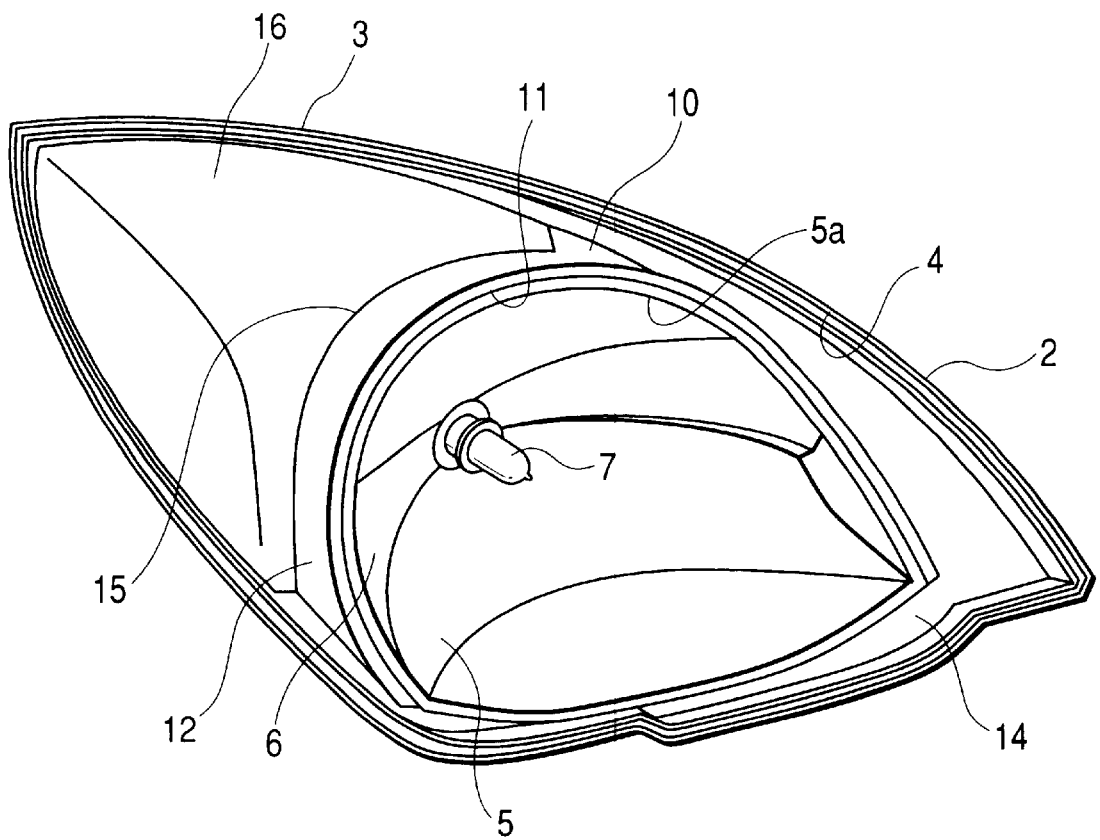
FIG. 1 shows a vehicle headlamp as a first embodiment of the invention together with FIGS. 2 to 5, and is a perspective view thereof without a lens.
Figure 2:
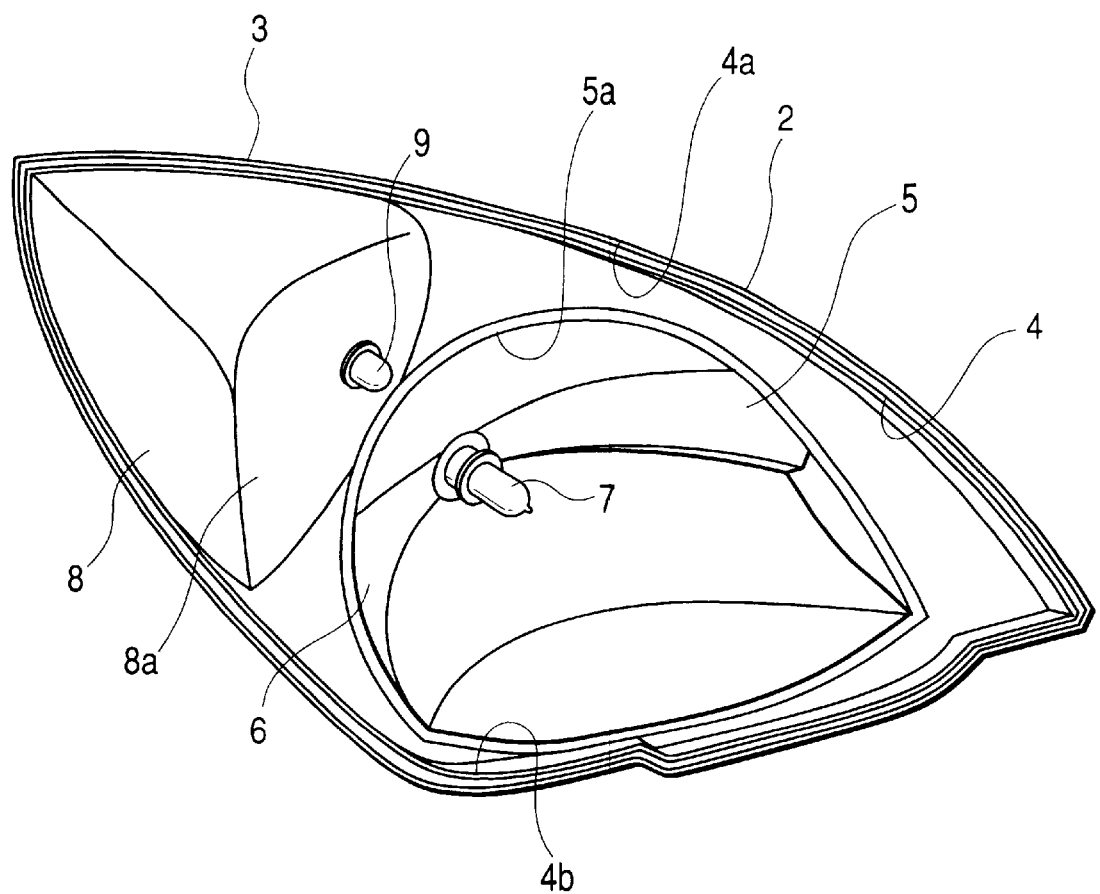
FIG. 2 is a perspective view in such a state that only a reflector is mounted on a body.
Figure 3:
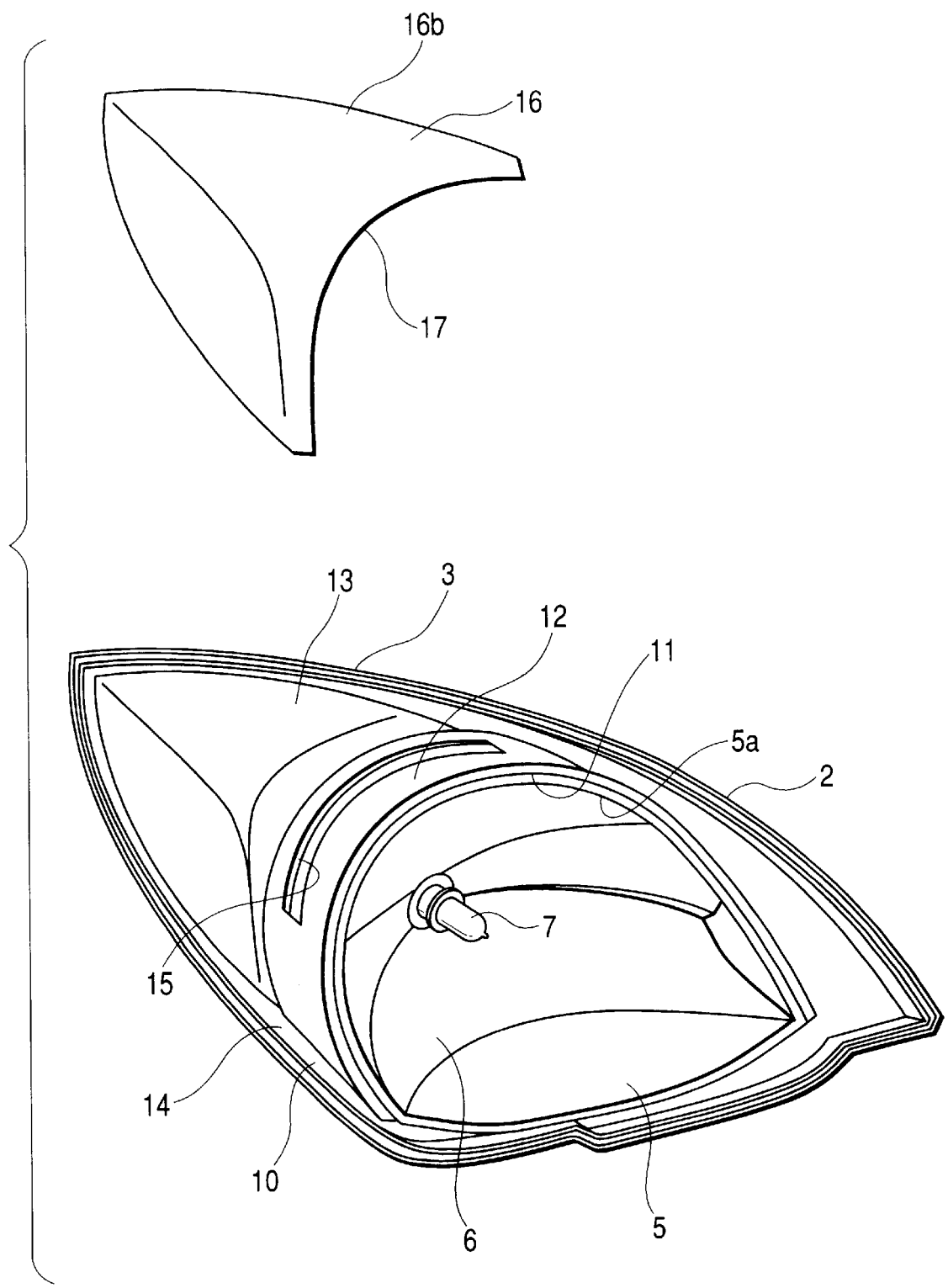
FIG. 3 is a perspective view in such a state that the reflector and a dummy portion are mounted and a light guide is separated.
Figure 4:
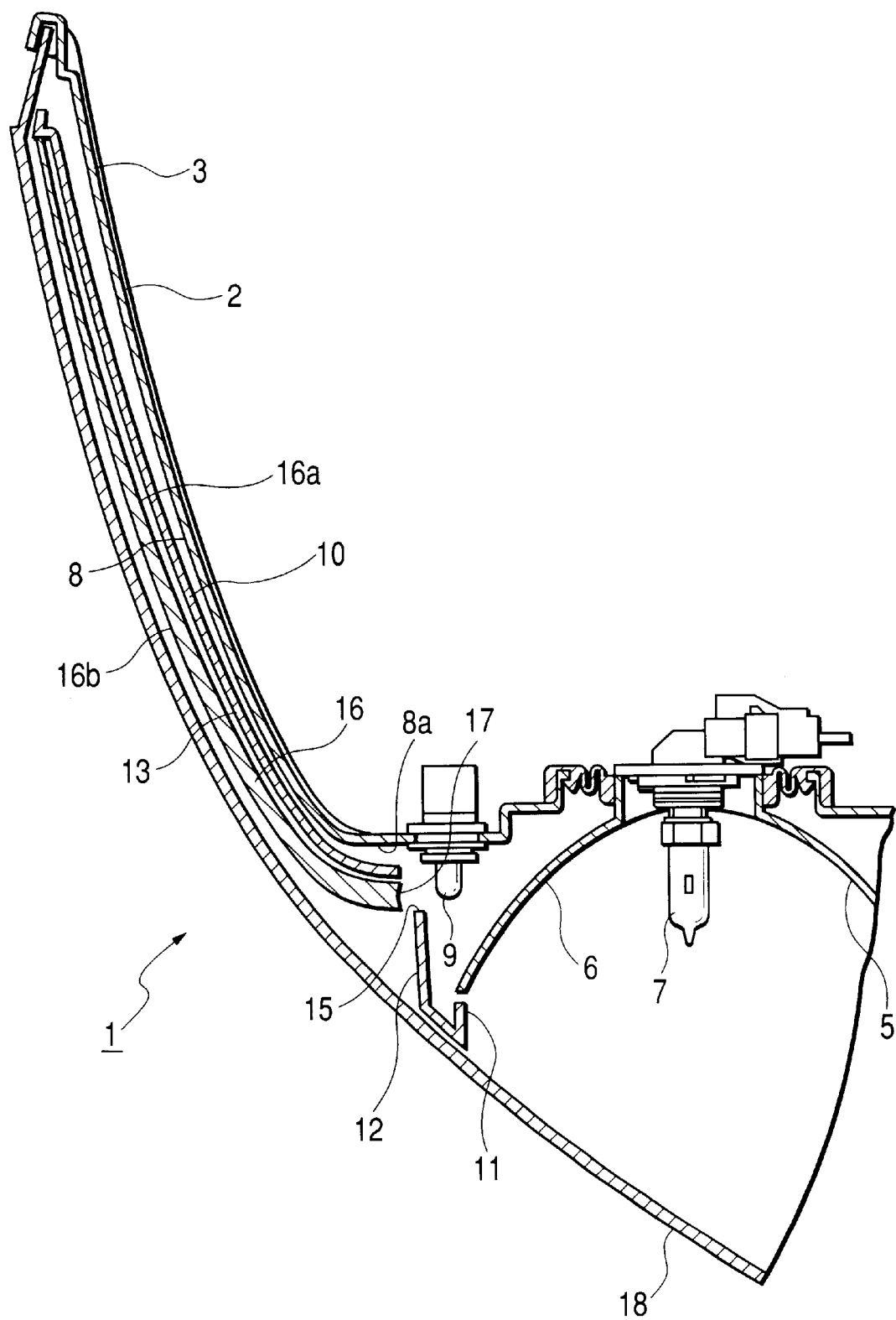
FIG. 4 is a horizontal sectional view of the principal part.
Figure 5:
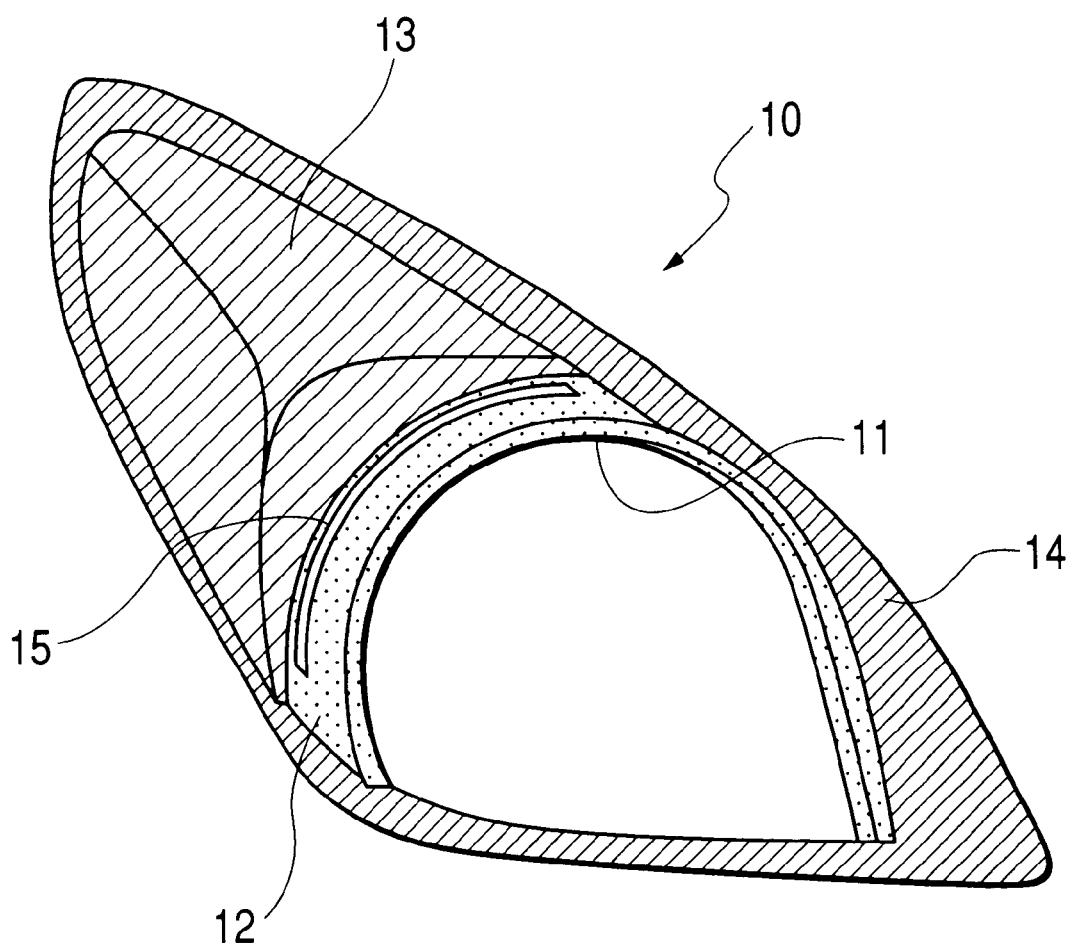
FIG. 5 is an elevational view of the dummy portion.

Embodiments of the invention will be described with reference to the accompanying drawings.

FIGS. 1 to 5 show a vehicle headlamp as a first embodiment of the invention.

A vehicle headlamp 1 has a lamp body. The lamp body 2 is a molded product of, for example, synthetic resin and has a rounded portion 3 that is rounded sideways. Further, the open face 4 of the lamp body 2 has such a configuration that the upper end portion 4a is largely displaced backward from the lower end portion 4b.

A reflector 5 has an opening 5a substantially close to a circle in shape and a reflective surface 6 forming a forwardly depressed curved surface. The reflective surface 6 is formed as a so-called step reflective surface such that the whole surface is divided into fine steps. The reflector 5 is tiltably supported by a support mechanism (not shown) and a main bulb 7 is supported by the reflector 5.

A swollen portion 8 swelling forward and upward is formed over most of the rounded portion 3 of the lamp body 2, and an auxiliary bulb 9 is supported with the front edge face 8a of the swollen portion 8.

An extension 10 as a dummy portion covers substantially the entire front of the lamp body 2, excluding a portion where the reflector 5 is disposed. The extension 10 in this embodiment is formed as a component part different from the lamp body 2 and the reflector 5, and an opening 11 for making the reflector 5 face forward is also formed.

The extension 10 has a portion 12 adjoining the reflector (shown by a sprinkled pattern in FIG. 5) that adjoins the opening 11, a concealed portion 13 (shown by a slant striped pattern in FIG. 5) that covers the surface side of the swollen portion 8 of the lamp body 2 and is positioned on the back side of a light guide as will be described later, and a frame portion 14 (shown by a cross striped pattern in FIG. 5) as the rest. A silver metallic coating is applied to the surface of the portion 12 adjoining the reflector, so that there is created a feeling of identification with the reflective surface 6 of the reflector 5 that is metallized, for example, aluminized. Moreover, a shade coating is applied to the surfaces of the concealed portion 13 and the frame portion 14.

A cutout hole 15 is formed along the boundary portion between the portion 12 adjoining the reflector and the concealed portion 13 of the extension 10. The auxiliary bulb 9 supported by the front edge face 8a of the swollen portion 8 of the lamp body 2 is seen from the cutout hole 15.

A light guide 16 is disposed in such a manner as to cover the surface of the concealed portion 13 of the extension 10. The light guide 16 is formed of plate-like transparent material, for example, transparent plastics that cover the surface of the concealed portion 13 of the extension 10 and its one end. The incident edge face 17 is so positioned as to correspond to the cutout hole 15 formed in the extension 10 and to face the auxiliary bulb 9. The back 16a of the light guide 16 is processed by pit and/or step-forming so that it reflects light incident upon the light guide and emits the reflected light from the surface 16b.

Further, the front of the lamp body 2 is covered with a transparent lens 18. Although in this embodiment, the lens 18 is a so-called see-through lens not formed with lens steps, the lens 18 may be a lens formed with lens steps.

In the case of the vehicle headlamp 1, while the main bulb 7 and the auxiliary bulb 9 are not turned on, such as in the daytime, external light is reflected from the reflective surface 6 of the reflector 5 and the portion 12 of the extension 10 adjoining the reflector, so that a common external appearance is created. Moreover, the light guide 16 covering the front side of the rounded portion 3 that is rounded sideways off the lamp body 2 causes the pits and/or steps formed therein to reflect external light and consequently, this portion 16 also helps to create a common external appearance along with the reflector 5 and the portion 12 adjoining the reflector. Incidentally, though the concealed portion 13 of the extension 10 positioned on the back of the light guide 16 has been described above as having shade coating, by applying a metallic reflective coating to the surface of this portion 13 as in the case of the portion 12 adjoining the reflector, for example, by applying a silver metallic coating thereto, the surface of the concealed portion 13 supplied with the metallic reflective coating is seen through the light guide 16 and further increases a common external appearance along with the reflector 5 and the portion 12 adjoining the reflector covered with the light guide.

At night, light beams are emitted forward by the reflector 5 with the main bulb 7 as well as the auxiliary bulb 9. Then light from the auxiliary bulb 9 is incident upon the light guide 16 from the incident edge face 17 of the light guide 16 and propagates throughout the light guide 16 while repeating internal reflection. As such, light is caused to propagate throughout the light guide 16 where it is reflected by the pits and/or steps formed on the back of the light guide, and emitted out of the surface 16b, whereby the surface 16b of the light guide 16 is illuminated. Therefore, the reflector 5 and the portion covered with the light guide 16 create a common external appearance.

As the incident edge face 17 of the light guide 16 is so disposed as to correspond to the cutout hole 15 formed in the dummy portion 10 of the vehicle headlamp 1, the incident edge face 17 thereof remains inconspicuous even though it is seen through the lens 18, so that the appearance of the vehicle headlamp is improved.

Figure 6:
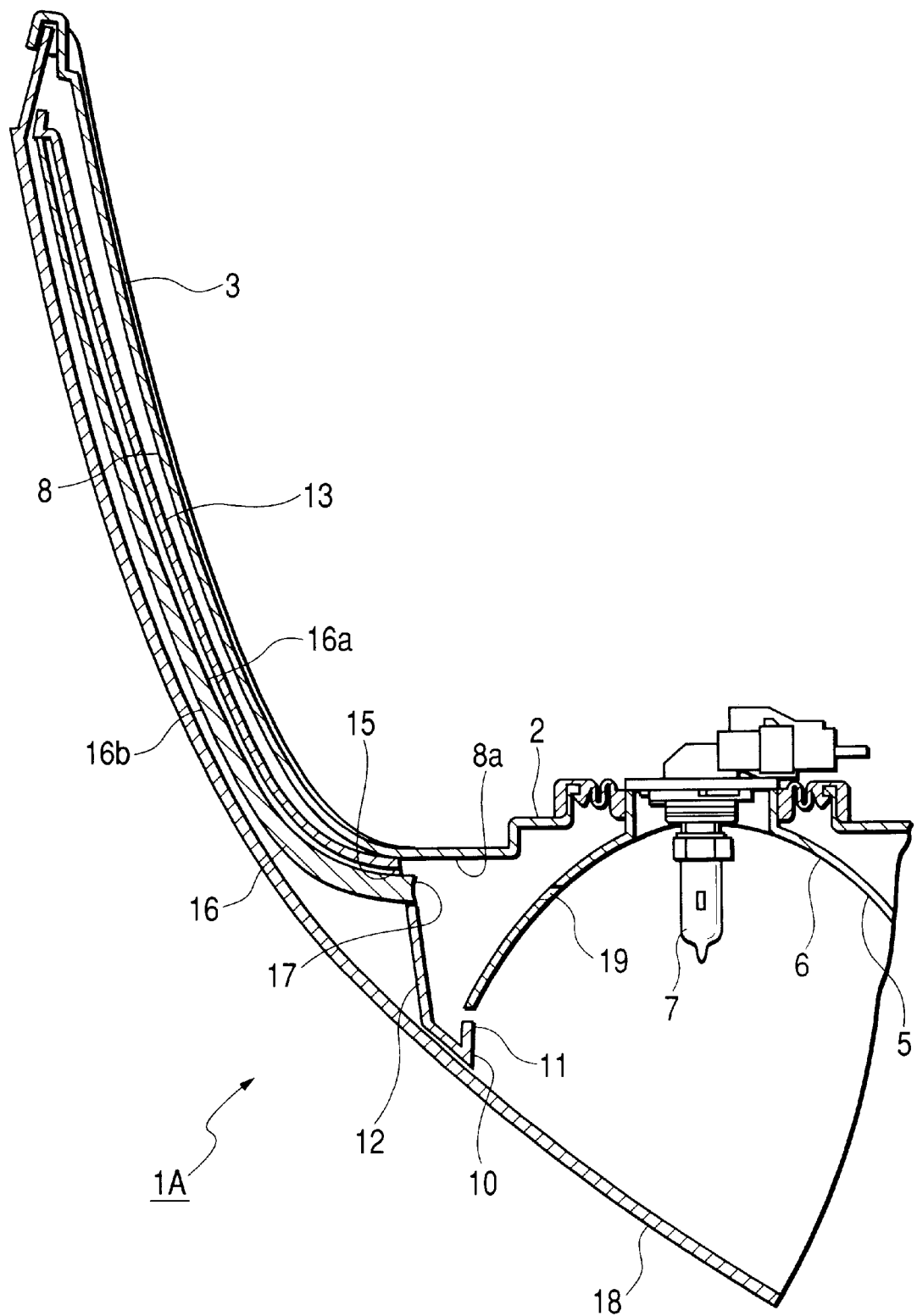
FIG. 6 is a horizontal sectional view of the principal part of a vehicle headlamp as a second embodiment of the invention.

FIG. 6 shows a vehicle headlamp as a second embodiment of the invention.

A vehicle headlamp 1A according to a second embodiment of the invention utilizes light from the main bulb 7 as a light source for the light guide without using the auxiliary bulb 9 as a light source for supplying light to the light guide 16. Since the rest of the features are similar to those described in the first embodiment of the invention, those different from the first embodiment will be described in detail.

In the vehicle headlamp 1A, a cutout hole 19 is formed in a portion corresponding to the cutout hole 15 formed in the extension 10 of the reflector 5 and the main bulb 7 can be seen through the cutout hole 19 of the reflector 5 from the cutout hole 15 of the extension 10.

When the main bulb 7 is turned on in the vehicle headlamp 1A according to the second embodiment of the invention, part of the light is incident via the cutout hole 19 of the reflector 5 upon the incident edge face 17 of the light guide 16 so disposed as to correspond to the cutout hole 15 of the extension 10. Then part of the light spreads throughout the light guide 16 and is reflected by the pits and/or steps on the back of the light guide 16 before being emitted from the surface 16b of the light guide 16.

Therefore, in the vehicle headlamp 1A according to the second embodiment of the invention, like the vehicle headlamp 1 according to the first embodiment of the invention, the light guide 16 is illuminated when the main bulb 7 is turned on, and a common external appearance is created with even the rounded portion 3 of the lamp body 2.

Although the extension 10 has been described as formed separately from the reflector 5 according to the above embodiments of the invention, the extension 10 may be formed integrally with the reflector 5.

Further, the cutout hole 15 of the extension 10 need not be formed in the boundary portion between the portion 12 adjoining the reflector and the concealed portion 13 that are formed integrally, but may be formed between the portion 12 adjoining the reflector and the concealed portion 13 that are separately formed. In a case where the portion 12 adjoining the reflector and the concealed portion 13 are separately formed, the portion 12 adjoining the reflector may be formed integrally with the reflector 5.

According to the invention, the appearance of the whole vehicle headlamp is improved by introducing light into the light guide which makes even the rounded portion of the headlamp illuminate. Because the incident edge portion of the light guide is positioned so as to correspond to the cutout portion formed in part of the dummy portion, the incident edge portion is hardly seen through the lens and accordingly, the appearance of the incident edge portion of the light guide does not spoil the appearance of the headlamp.

In one embodiment of the invention, the light source may include an auxiliary light source disposed on the back of the dummy portion. The use of this special light source for use in the light guide ensures that light can be incident upon the light guide. Since the auxiliary light source is disposed on the back of the dummy portion, the auxiliary light source is hardly seen from the outside and thus, the headlamp's appearance is improved.

In another embodiment, the light source may be the main light source provided in the reflector and a cutout portion is formed in part of the reflector. As such, light from the main light source is made incident upon the incident edge portion of the light guide via the cutout portion of the reflector. Accordingly, since an additional or auxiliary light source is not needed to separately provide light for the light guide, the vehicle headlamp of this embodiment is less costly.

In addition to the embodiments of the invention as described above, it is also possible to make the following arrangements.

More specifically, the invention may include a vehicle headlamp, wherein the dummy portion is divided into a portion adjoining the reflector, the portion being used for covering a portion adjoining the opening of the reflector, and a concealed portion positioned on the back of the light guide and wherein the incident edge portion of the light guide is correspondingly positioned between the portion adjoining the reflector and the concealed portion.

The present invention is not limited to the specific above-described embodiments. It is contemplated that numerous modifications may be made to the present invention without departing from the spirit and scope of the invention as defined in the claims.

What is claimed is:

1. A vehicle headlamp comprising:

a body including at least a portion having a curved form;

a reflector disposed in the body, an opening of the reflector substantially directed forward;

a dummy portion extending from the opening of the reflector to an end of the curved portion of the body, the dummy portion including a cutout portion formed close to the opening of the reflector;

a light guide disposed along at least a part of the dummy portion; and a light source, wherein an incident edge portion of the light guide is positioned to correspond to the cutout portion, and wherein the light guide is operable to illuminate as light from the light source becomes incident upon the incident edge portion of the light guide and is caused to spread throughout the light guide.

2. The vehicle headlamp as claimed in claim 1, wherein the light source is a main light source provided in the reflector, and wherein a cutout portion is formed in part of the reflector whereby to make light from the main light source incident upon the incident edge portion of the light guide via the cutout portion of the reflector.

3. The vehicle headlamp as claimed in claim 1, wherein the dummy portion is divided into a portion adjoining the reflector, the portion being used for covering a portion adjoining the opening of the reflector, and a concealed portion where the light guide is disposed, wherein the incident edge portion of the light guide is correspondingly positioned between the portion adjoining the reflector and the concealed portion.

4. The vehicle headlamp as claimed in claim 3, wherein the light source is an auxiliary light source disposed on a back of the dummy portion.

5. The vehicle headlamp as claimed in claim 3, wherein the light source is a main light source provided in the reflector, and wherein a cutout portion is formed in part of the reflector whereby to make light from the main light source incident upon the incident edge portion of the light guide via the cutout portion of the reflector.

6. The vehicle headlamp as claimed in claim 1, wherein the light source is an auxiliary light source disposed on a back of the dummy portion.

7. The vehicle headlamp as claimed in claim 6, wherein the light source is a main light source provided in the reflector, and wherein a cutout portion is formed in part of the reflector whereby to make light from the main light source incident upon the incident edge portion of the light guide via the cutout portion of the reflector.

* * * * *